(12) United States Patent
Tanaka et al.

(10) Patent No.: US 7,494,100 B2
(45) Date of Patent: Feb. 24, 2009

(54) ELECTRONIC EQUIPMENT TILTING AND ROTATING APPARATUS

(75) Inventors: Takehiko Tanaka, Tokyo (JP); Hisahiro Tanaka, Chiba (JP)

(73) Assignee: Sony Corporation (JP)

( * ) Notice: Subject to any disclaimer, the term of this patent is extended or adjusted under 35 U.S.C. 154(b) by 450 days.

(21) Appl. No.: 10/990,248

(22) Filed: Nov. 16, 2004

(65) Prior Publication Data

US 2005/0224689 A1 Oct. 13, 2005

(30) Foreign Application Priority Data

Dec. 1, 2003 (JP) .......................... P2003-401913

(51) Int. Cl.
*A47F 5/00* (2006.01)
(52) U.S. Cl. ............. 248/292.13; 248/919; 248/292.12; 361/682
(58) Field of Classification Search ............. 248/291.1, 248/288.11, 292.11–13, 284.1, 286.1, 292.14, 248/582, 587, 590, 594, 597, 919–923; 361/681, 361/682
See application file for complete search history.

(56) References Cited

U.S. PATENT DOCUMENTS

| | | | | |
|---|---|---|---|---|
| 4,589,621 | A * | 5/1986 | Hunt et al. ................... | 248/586 |
| 6,199,809 | B1 * | 3/2001 | Hung ....................... | 248/284.1 |
| 6,296,217 | B1 * | 10/2001 | Ikedo et al. ............ | 248/292.12 |
| 6,478,275 | B1 * | 11/2002 | Huang ..................... | 248/284.1 |
| 6,672,553 | B1 * | 1/2004 | Lin .......................... | 248/276.1 |
| 6,695,274 | B1 * | 2/2004 | Chiu .......................... | 248/371 |

FOREIGN PATENT DOCUMENTS

| | | |
|---|---|---|
| DE | 19755621 A1 | 6/1999 |
| DE | 10042495 A1 | 3/2002 |
| EP | 0409232 | 1/1991 |
| EP | 0753431 | 1/1997 |
| JP | 2-1385 U | 1/1990 |

(Continued)

OTHER PUBLICATIONS

Japanese Office Action issued on Jul. 29, 2008 in connection with corresponding Japanese Application No. 2003-401913 (3 pages).

*Primary Examiner*—Amy J Sterling
*Assistant Examiner*—Steven Marsh
(74) *Attorney, Agent, or Firm*—Lerner, David, Littenberg, Krumholz & Mentlik, LLP

(57) ABSTRACT

A torsion coil spring spring-biases a rotary plate in such direction that a display unit may be rotated around rotary shafts, so as to rise from a horizontal position. An extension spring spring-biases the display unit, so that the display unit may be changed from an anti-rising direction to a rising direction while the display unit is being rotated, whereby a driving torque may become substantially constant against the weight of the display unit. One end of the extension spring is engaged with the rotary plate and the other end thereof is engaged with an engagement pin disposed at a position displaced from the center of the rotary shaft of the display unit. The length of the extension spring becomes longest while the rotary plate is being tilted and rotated. Thus, the electronic equipment tilting and rotating apparatus can tilt and rotate the display unit with application of a necessary and minimum driving torque.

6 Claims, 9 Drawing Sheets

FOREIGN PATENT DOCUMENTS

| | | |
|---|---|---|
| JP | 4-368244 A | 12/1992 |
| JP | 5-042853 A | 2/1993 |
| JP | 05-044465 Y2 | 11/1993 |
| JP | 06-199186 | 7/1994 |
| JP | 9-016095 A | 1/1997 |
| JP | 2000-105544 | 4/2000 |
| JP | 2001-118482 A | 4/2001 |
| JP | 2001-157141 A | 6/2001 |
| JP | 2003-066855 | 3/2003 |

* cited by examiner

ELECTRONIC EQUIPMENT TILTING AND ROTATING APPARATUS

BACKGROUND OF THE INVENTION

1. Field of the Invention

The present invention relates to an electronic equipment tilting and rotating apparatus, and particularly to a tilting and rotating apparatus for use with a display panel rotating mechanism of a built-in type display apparatus, such as a vehicle television receiver and a car navigation system.

2. Description of the Related Art

As vehicle electronic equipment such as a vehicle television receiver and a car navigation system, there is known built-in type vehicle electronic equipment in which a display apparatus such as a liquid-crystal monitor is housed within a car instrument panel or a car console panel. When this kind of vehicle electronic equipment is not in use, the display apparatus is housed within a compartment portion of a main body of the vehicle electronic equipment. Also, when this vehicle electronic equipment is in use, the display apparatus is moved (slid and tilted) to the ejected position of the front of the main body and it becomes available for practical use.

FIG. 1 of the accompanying drawings shows an example of such vehicle electronic equipment. More specifically, FIG. 1 is an outward appearance perspective view showing the state in which a display panel 91 is moved to the front of a main body 92 of the vehicle electronic equipment and is thereby placed at the ejected position. As schematically shown in FIG. 1, this vehicle electronic equipment comprises the display panel 91, the main body 92 and an arm 93.

As shown in FIG. 1, the display panel 91 is rotatably supported to the main body 92 through the arm 93. Although not shown, the display panel 91 has a suitable means such as a tilt gear disposed at its back surface. This tilt gear is meshed with a transmission gear (that is, part of a mechanical assembly which will be described later on) disposed within the main body 92. Then, the tilt gear is rotated as the transmission gear is rotated, whereby the display panel 91 is rotated around a support shaft 94 of the arm 93.

Although not shown, the main body 92 of this vehicle electronic equipment comprises a compartment portion for housing therein the display panel 91 or the like and a control circuit for energizing and controlling the display panel 91. The main body 92 is held on the vehicle electronic equipment such that the mechanical assembly including the arm 93 can be slid freely.

Although not shown, this mechanical assembly is composed of a sliding and moving mechanism and a tilting and rotating mechanism in addition to the arm 93. The sliding and moving mechanism is composed of a slide motor and a coaxial gear for sliding the mechanical assembly within the main body 92. Also, the tilting and rotating mechanism is composed of a tilt motor and a transmission gear by which the display panel 91 is tilted and rotated.

When the mechanical assembly is slid and moved, the arm 93 moves the display panel 91 while holding the display panel 91 in substantially the horizontal direction. Also, when the display panel 91 is tilted and rotated, the arm 93 properly holds the display panel 91 which can be rotate around the support shaft 94.

Operations of such vehicle electronic equipment according to the related art will be described with reference to FIGS. 2A to 2D. FIGS. 2A to 2D are schematic diagrams to which reference will be made in explaining the manner in which the display panel 91 is slid from the housing position within the main body 92 to the ejected position of the front of the main body 92 so that the display panel 91 may rise from the horizontal state. It is customary that such vehicle electronic equipment is housed within the instrument panel of the car.

First, when the sliding and moving mechanism of the mechanical assembly starts driving the display panel 91 in the state in which the display panel 91 is housed within the main body 92, as shown in FIG. 2A, the display panel 91 joined to the mechanical assembly itself by means of the arm is slid and moved toward the front (shown by an arrow 100A of FIG. 2A) of the main body 92. Then, as shown in FIG. 2B, when the display panel 91 is completely ejected from the main body 92, the sliding and moving mechanism stops driving the display panel 91.

Next, in this state, the tilting and rotating mechanism of the mechanical assembly starts driving the display panel 91. When the tilting and rotating mechanism starts driving the display panel 91, rotation driving force is transmitted to the tilt gear of the display panel 91 so that the display panel 91 is rotated (tilted up) so as to rise in the direction shown by an arrow 110A in FIG. 2C.

After that, the display panel 91 is continued to be tilted and rotated with application of the driving force of the tilting and rotating mechanism and as shown in FIG. 2D, the display panel 91 is tilted up to the available position at which it becomes perpendicular to the arm 93 and at which it becomes available for use, for example. When the display panel 91 is rotated to this position at which it becomes available for use, the tilting and rotating mechanism stops driving the display panel 91.

As described above, according to the related-art vehicle electronic equipment, when a user uses the display panel 91 housed within the main body 92, the display panel 91 can automatically be slid and moved up to the ejected position of the front of the main body 92 so that it can be tilted and rotated up to the available position at which the display panel 91 becomes available for use.

Also, as other driving mechanism for use with vehicle electronic equipment according to the related art, there is known such a driving mechanism by which a display panel can be lowered and moved to properly adjust the available position of the display panel after the display apparatus was slid, moved, tilted and rotated up to the ejected position of the front of the main body when the display apparatus is in use (cited patent reference 1).

[Cited patent reference 1]: Official gazette of Japanese laid-open patent application No. 2003-66855 (page 2, FIG. 4)

However, in the vehicle electronic equipment of the example shown in FIG. 1 and FIGS. 2A to 2D, since the tilting and rotating mechanism starts operating from the state in which the display panel 91 is placed in substantially the horizontal direction shown in FIG. 2B in which the display panel 91 was completely ejected from the main body 92, moment generated by the weight of the display panel 91 is large in the beginning in which the display panel 91 starts rotating so that an initial driving torque becomes is increased unavoidably.

The reason for this will be described below. That is, moment of rotation may be obtained by multiplying a distance (moment's arm) between an action line passing the center of gravity of the display panel 91 and which is generated by the weight of the display panel 91 and the center of the rotary shaft 94 with the weight of the display panel 91. Therefore, the length of the moment's arm is changed with the rotation of the display panel 91. Thus, when the display panel 91 is placed in substantially the horizontal direction, moment of rotation becomes the maximum. When the display panel 91 is placed in the vertical direction, the moment of rotation becomes zero. Accordingly, when the display panel 91 is placed in substantially the horizontal direction, the moment of rotation becomes the maximum value.

Then, the driving torque necessary for rotating the display panel 91 against the moment of rotation generated by the weight of the display panel 91 is increased and hence a motor having a large driving torque becomes necessary. However, when the display panel 91 is tilted and rotated in the state in which the display panel 91 rises to a certain extent, the length of the moment's arm is reduced and hence a driving torque that is not so large is not required. Therefore, when the vehicle electronic equipment is in practical use, it is sufficient that the display panel 91 may be driven with application of a very small driving torque by which "backlash" (play) of a gear and backlash of a driving gear against vibrations of a vehicle can be removed and by which moment of one direction generated around the rotary shaft can be applied to the display panel.

When a motor for tilting and rotating a display panel according to the related art is selected, since a motor corresponding to a large driving torque in the beginning in which the motor starts driving is selected, a motor having a large torque as compared with an average driving torque is selected and there are disadvantages in which the related-art tilting and rotating apparatus consumes large electric power and in which it also occupies a large space.

For these reasons, as a tilting and rotating apparatus for use with vehicle electronic equipment, there has so far been required a tilting and rotating apparatus using a motor having a necessary and minimum driving torque and of which power consumption is small. Also, so far it has been requested that a tilting and rotating apparatus can effectively use a space in the mechanical assembly by using a small motor.

SUMMARY OF THE INVENTION

In view of the aforesaid aspect, it is an object of the present invention to provide an electronic equipment tilting and rotating apparatus which can tilt and rotate electronic equipment mounted thereon by a necessary and minimum driving torque.

According to an aspect of the present invention, there is provided an electronic equipment tilting and rotating apparatus having a rotated member joined by a rotating mechanism mounted on a frame, the rotated member tilted and rotated against gravity by the rotating mechanism of the frame so that the rotated member can be used. This electronic equipment tilting and rotating apparatus is comprised of a first elastic member for spring-biasing the rotated member around a rotary shaft of the rotated member so that the rotated member rises from the horizontal direction and a second elastic member for spring-biasing the rotated member during the rotated member is being rotated from the anti-rising direction to the rising direction in which the second elastic member makes a driving torque become substantially constant against the weight of the rotated member.

According to this arrangement, the electronic equipment tilting and rotating apparatus of the present invention can decrease a starting torque required to start rotating the rotated member to rise from substantially the horizontal state. Also, a driving torque in the rotation process becomes substantially constant and a motor of which torque capacity is necessary and minimum can be used, power consumption of the motor being decreased. Further, this electronic equipment tilting and rotating apparatus can be miniaturized in size and it can save its space within a mechanical assembly.

According to other aspect of the present invention, in the above-mentioned electronic equipment tilting and rotating apparatus, the second elastic member has one end engaged with the frame and it has also the other end engaged with an engagement pin disposed at the position displaced from the center of the rotary shaft of the rotated member, the second elastic member being disposed such that its length becomes longest during the rotated member is being tilted and rotated.

According to a further aspect of the present invention, in the above-mentioned electronic equipment tilting and rotating apparatus, the first elastic member is a torsion coil spring and the second elastic member is an extension spring.

According to yet a further aspect of the present invention, in the above-mentioned electronic equipment tilting and rotating apparatus, the frame with the rotated member joined thereto includes a sliding and moving means.

According to this arrangement, in this electronic equipment tilting and rotating apparatus of the present invention, the rotated member and all units mounted on the frame are generally housed within the electronic equipment. According to the need, the frame with the rotated member jointed thereto can be slid and protruded, whereafter the rotated member can be tilted and rotated from the frame and it may become available for use.

BRIEF DESCRIPTION OF THE DRAWINGS

FIGS. 3A and 3B are outward appearance perspective views showing a slide unit of vehicle electronic equipment, wherein FIG. 3A is an outward appearance perspective view showing the state in which a display panel is slid in the lateral direction from an electronic equipment compartment so that a slide unit is placed in substantially the horizontal direction and FIG. 3B is a rear perspective view showing the state in which the display panel is tilted so as to rise from the horizontal state after the slide unit was slid;

FIGS. 5A to 5C are schematic diagrams to which reference will be made in explaining rotation of an engagement pin of a partial gear assembly and spring-biasing force of a torsion coil spring, wherein FIG. 5A is a schematic diagram showing the state in which the display unit is placed in substantially the horizontal direction, FIG. 5B is a schematic diagram showing the state in which the display unit is being rotated and FIG. 5C is a schematic diagram showing the state in which rotation of the display unit is completed, respectively;

DESCRIPTION OF THE PREFERRED EMBODIMENTS

The present invention will now be described with reference to the drawings.

According to an electronic equipment tilting and rotating apparatus according to the present invention, a motor for use with the tilting and rotating apparatus may have a necessary and minimum driving torque and hence, this tilting and rotating apparatus can consume small electric power and can save a space.

The electronic equipment tilting and rotating apparatus according to an embodiment of the present invention will be described below with reference to FIGS. 3A, 3B to FIG. 9.

Figure 1:
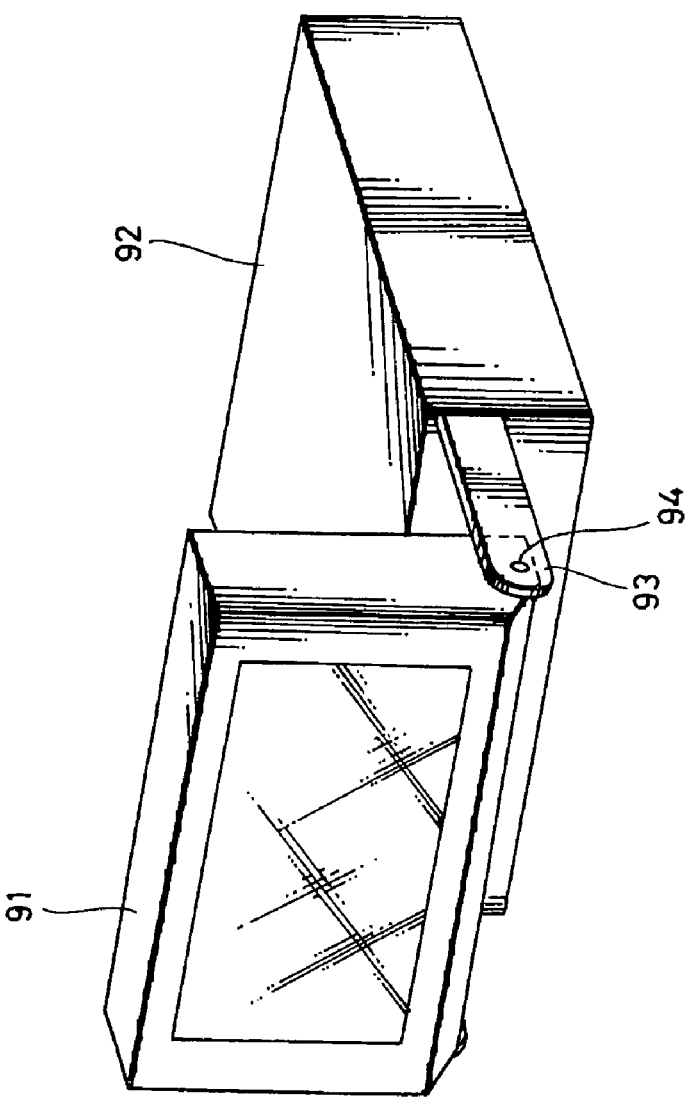
FIG. 1 is an outward appearance perspective view showing an example of vehicle electronic equipment according to the related art.
Figure 2A:
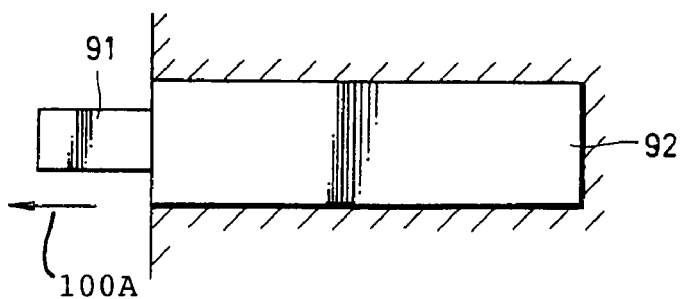
FIGS. 2A to 2D are respectively schematic diagrams to which reference will be made in explaining operations of the vehicle electronic equipment shown in FIG. 1 according to the related art.
Figure 2B:
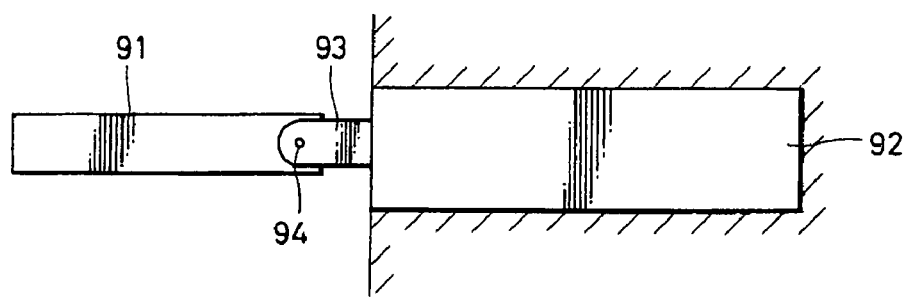
Figure 2C:
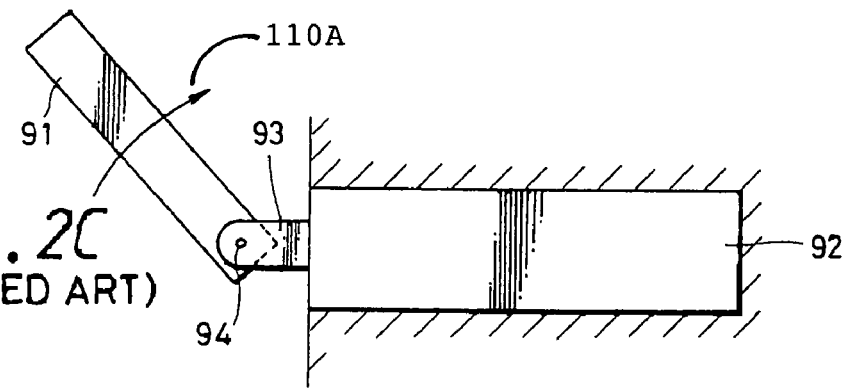
Figure 2D:
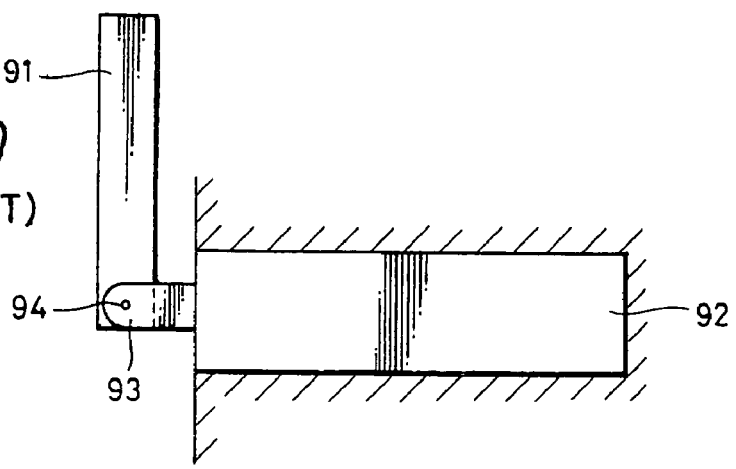
Figure 3A:
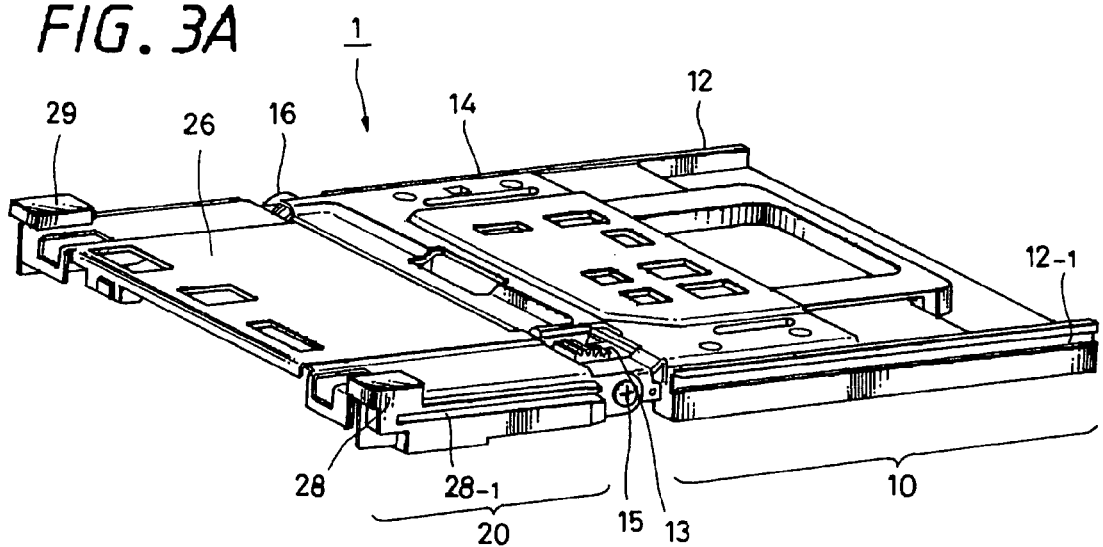
Figure 3B:
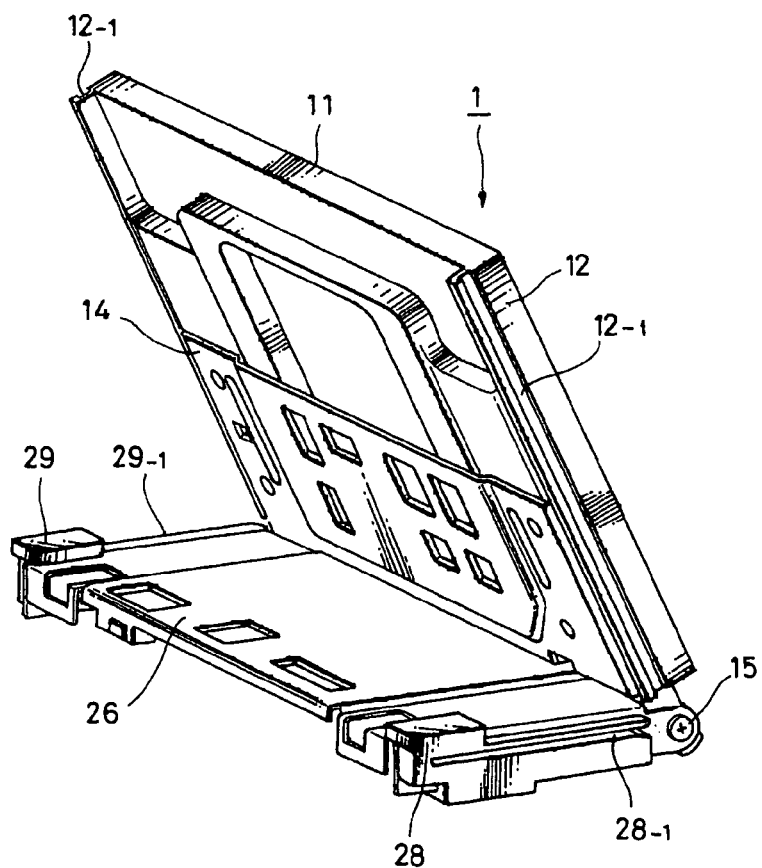

FIGS. 3A and 3B show a slide unit 1 having a display panel such as a liquid-crystal display device mounted thereon for use with a car navigation system that is an example of the vehicle electronic equipment shown in FIG. 1.

More specifically, FIG. 3A is a perspective view showing the state in which the slide unit 1 is placed in substantially the horizontal direction after the display panel of the slide unit 1 was slid and moved in the lateral direction from an electronic equipment compartment such as an instrument panel or a console panel of the car. FIG. 3B is a rear perspective view showing the state in which the slide unit 1 becomes available for use after the display panel rose from the horizontal state since the display panel has been slid and moved in the lateral direction from the electronic equipment compartment.

As shown in FIGS. 3A and 3B, the slide unit 1 comprises a display unit 10 and a mechanical assembly 20. The display unit 10 and the mechanical assembly 20 are joined by rotary shafts 15, 16 which are provided coaxially.

The display unit 10 is composed of a fixed plate 12 with a display panel 11 and the like fixed thereto and a rotary plate 14 with this fixed plate 12 fixed thereto.

The display panel 11 is a liquid-crystal display device to display proper information such as road map information and facilities/sightseeing information in color.

As shown in FIGS. 3A and 3B, the fixed plate 12 is decreased in weight by partly thinning substantially square-like aluminum or aluminum alloy and other light-metal plate material while its strength is being maintained. Then, the fixed plate 12 has slide grooves 12-1, 12-1 formed at their respective sides to guide the display panel 11 so that the display panel 11 and an equipment main body fixed to the car instrument panel can be slid forwards and backwards smoothly.

Figure 4:
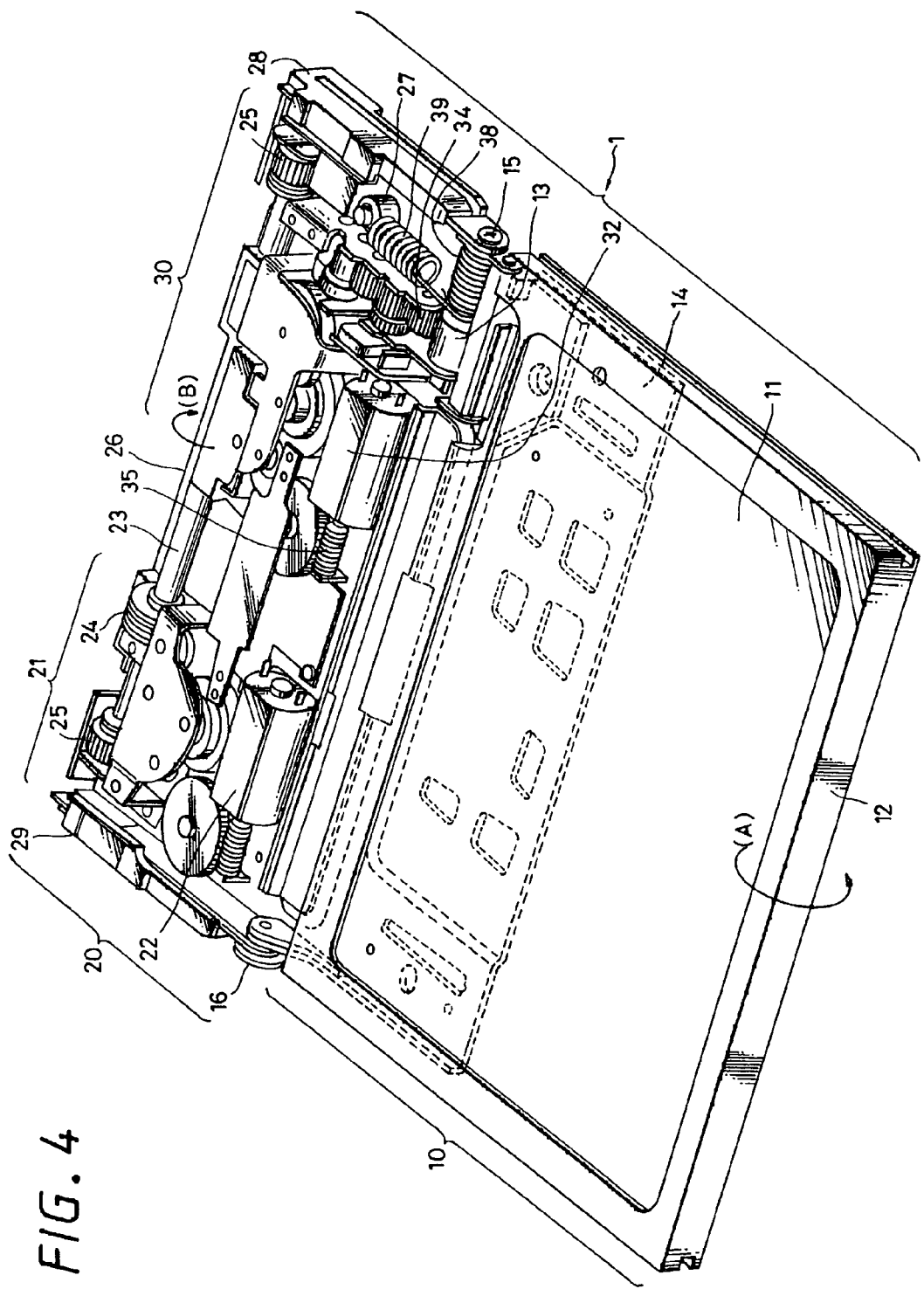
FIG. 4 is an outward appearance perspective view showing the state in which the state shown in FIG. 3A is inverted and to which reference will be made in explaining a drive mechanism of a tilting and rotating mechanism according to the present invention.

As shown in FIGS. 3A, 3B and as shown by a broken line in FIG. 4 which is a top perspective view of FIG. 3A, the rotary plate 14 is a substantially rectangular-shaped plate treated by an embossing process or whose peripheral edge is treated by a folding process in order to increase its strength. Then, the rotary plate 14 has a plurality of holes to connect electric wires from the display unit 10 to terminals provided in the inside of the equipment main body. These holes of the rotary plate 14 are also used to decrease the weight of the rotary plate 14. Insertion apertures for receiving the rotary shafts 15, 16 are formed on the two folded portions of the short sides of the plate, respectively. Then, a partial gear assembly 13 is provided near the right-hand side rotary shaft 15 shown in FIG. 4 in such a manner that a rotation center 13a of a partial gear of the partial gear assembly 13 may substantially coincide with the centers of the rotary shafts 15, 16.

Figure 5A:
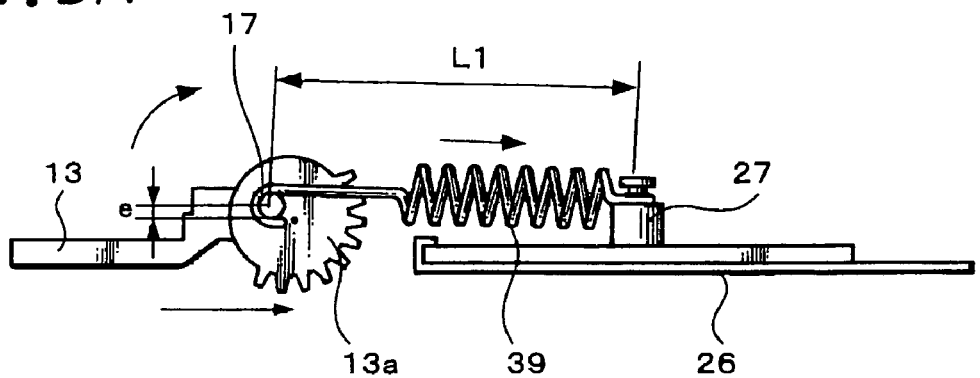
Figure 5B:
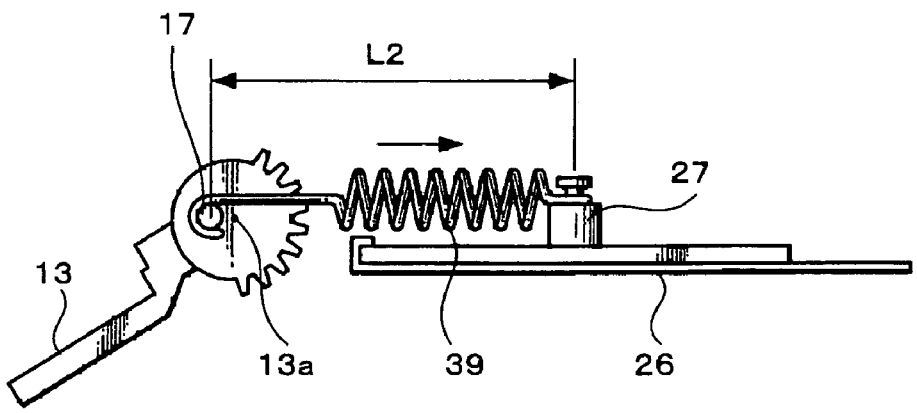
Figure 5C:
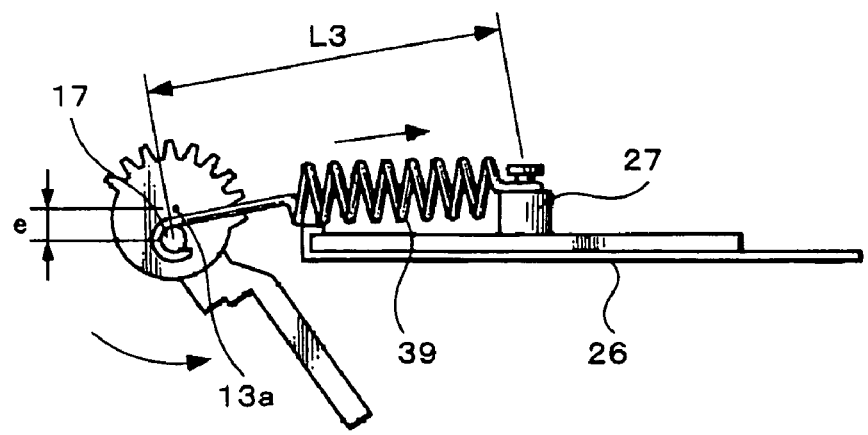

As shown in FIGS. 5A to 5C, the partial gear assembly 13 has a tooth form of a spur gear formed on its substantially half circumference and it has also an attachment bracket of the rotary plate 14 formed on the area in which the tooth form of the circumference is not formed. Then, an engagement pin 17 with which one end of a spring engages is formed at the position displaced from the rotation center 13a of this partial gear.

Referring back to FIG. 4, a mechanical assembly 20 is composed of a mechanical plate 26, a sliding and moving mechanism 21 mounted on the mechanical plate 26 to slide the slide unit 1 itself and a tilting and rotating mechanism 30 for tilting and rotating the display unit 10, etc.

The mechanical plate 26 is a substantially rectangular-like plate treated by an embossing process or of which peripheral edge is folded in order to increase its strength. The mechanical plate 26 has a plurality of holes to connect electric wires to terminals provided in the inside of the equipment main body in order to control supply of power to the sliding and moving mechanism 21 and the tilting and rotating mechanism 30. These holes on the mechanical plate 26 may contribute to decrease of the weight of the plate.

As shown in FIG. 4, the mechanical plate 26 has insertion apertures formed at respective end portions of the two folded portions thereof to receive the rotary shafts 15, 16 and it has also a pin 27 formed thereon to fix one end of the spring thereto.

As shown in FIGS. 3A, 3B and FIG. 4, slide guides 28, 29 having notches 28-1, 29-1 are formed on the side surfaces of the two sides of the folded portions of the short sides of the plate.

As shown in FIG. 4, the sliding and moving mechanism 21 decelerates rotation force of a motor 22 through a worm gear (not shown) and a spur gear (not shown) to increase a driving torque and transmits the rotation force of the motor 22 to a worm 24 provided on a slide drive shaft 23 to drive slide drive pinions 25, 25 provided at both ends of this slide drive shaft 23.

Of a pair of a slide drive rack gear and a slide guide protrusion, not shown, provided on the equipment main body, the former is meshed with the slide drive pinions 25, 25 and the latter is engaged with the slide guide notches 28-1, 29-1 of the mechanical plate 26 and the slide grooves 12-1, 12-1 of the fixed plate 12.

As a result, the slide unit 1 can be moved forwards and backwards to the equipment main body housing position and the ejected position of the front by the sliding and moving mechanism 21 of the slide unit 1.

Figure 6A:
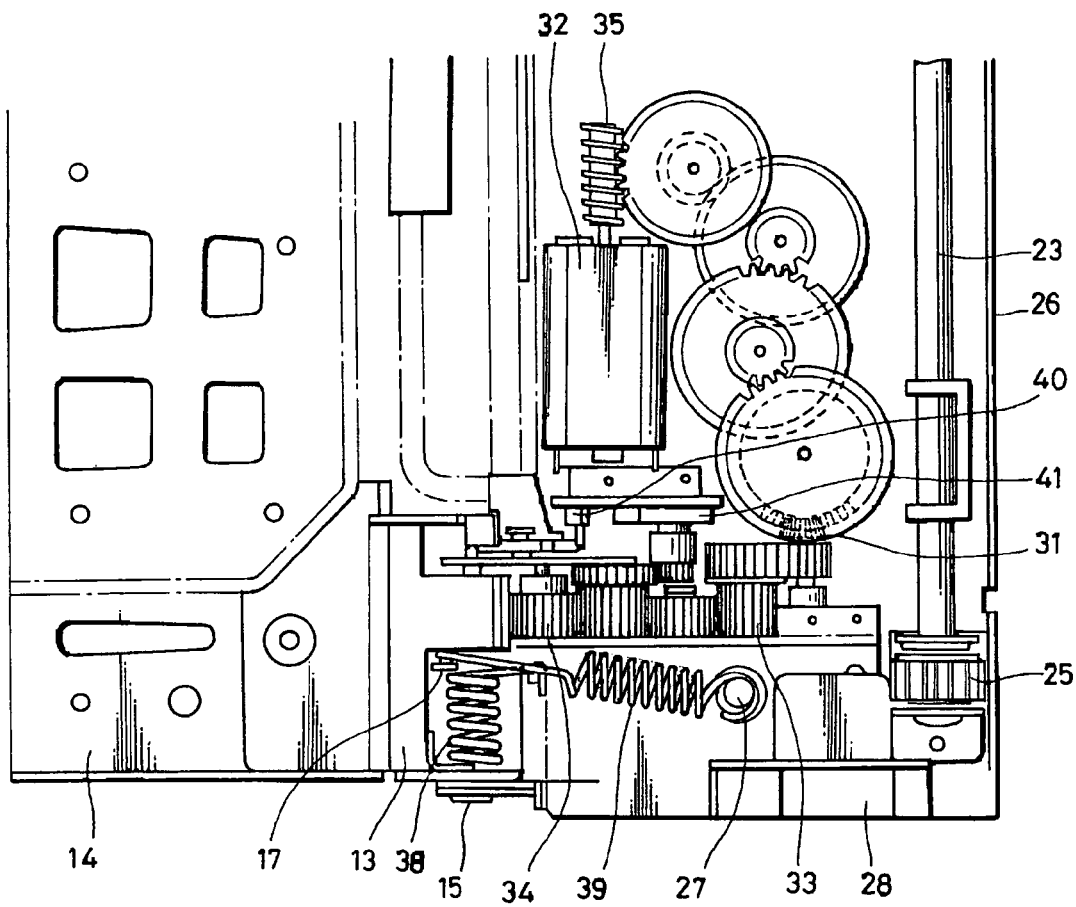
FIGS. 6A and 6B are respectively a plan view and a side view to which reference will be made in explaining the tilting and rotating mechanism according to the present invention and show the state in which the display panel is slid and moved.
Figure 6B:
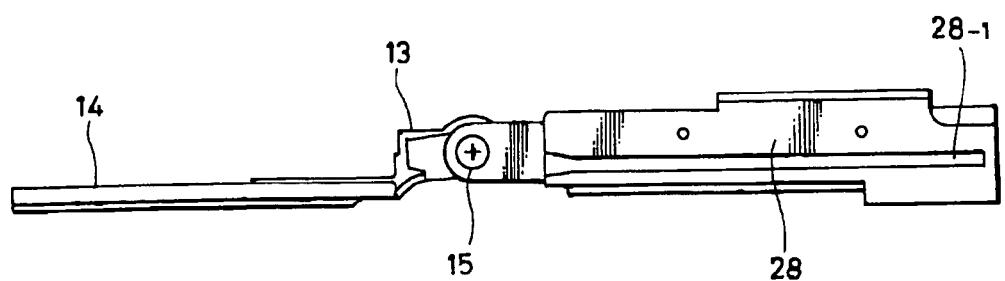

As shown in FIGS. 4, 6A and 6B, having decelerated the rotation force of the motor 22 by means of the worm gear and the spur gear, the tilting and rotating mechanism 30 transmits the rotation force of the motor 22 to a reduction gear train 33 by means of a bevel gear 31. Then, a gear provided at the last stage decelerate the rotation force of the motor 22 up to a reduction gear ratio of approximately 1/100 to thereby amplify the driving torque to tilt and rotate the slide unit 1.

As shown in FIG. 4, the mechanical plate 26 and the rotary plate 14 are constructed as described above and the mechanical plate 26 and the rotary plate 14 are joined so as to become freely rotatable by inserting the rotary shafts 15, 16 into rotary shaft apertures thereof. The rotary shaft 15 shown in FIG. 4 is elongated such that its shaft may protrude inwardly to serve as a shaft.

Then, as shown in FIG. 4, the partial gear assembly 13 of the rotary plate 14 is meshed with the gear 34 of the last stage of the reduction gear train 33 of the mechanical plate 26 and is thereby assembled into the slide unit 1 so as to be rotated freely by the rotary shafts 15, 16.

Figure 7A:
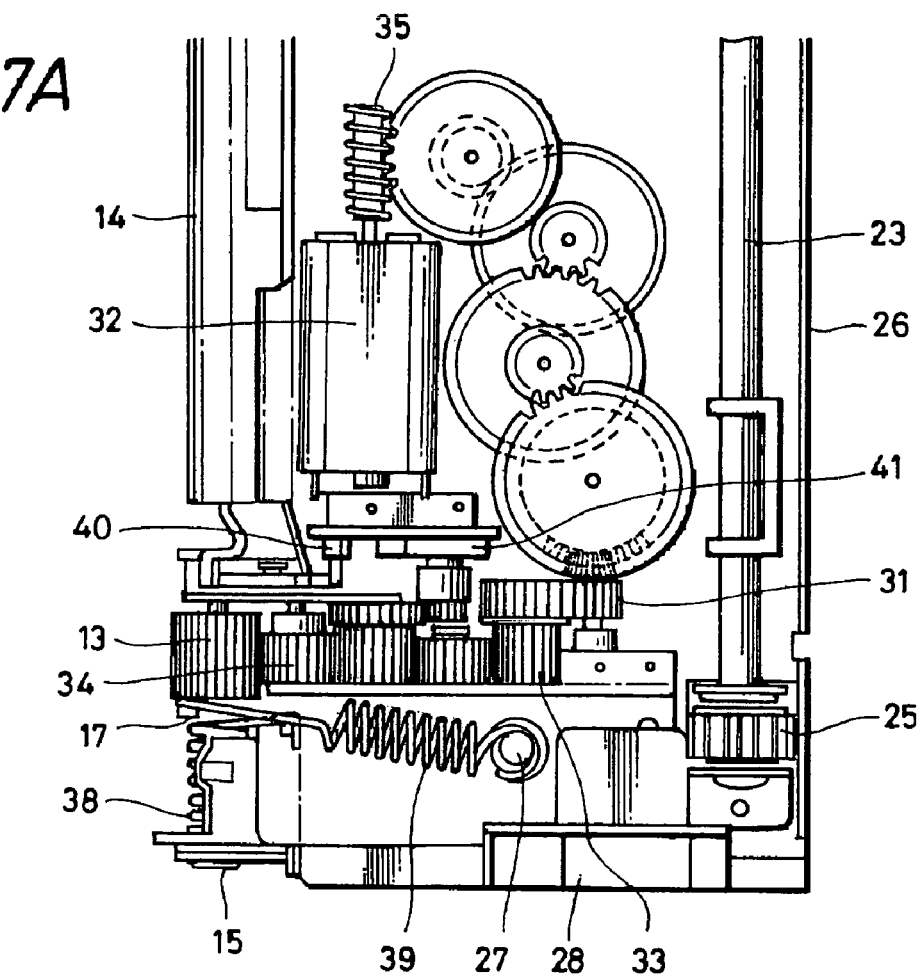
FIGS. 7A and 7B are respectively a plan view and a side view to which reference will be made in explaining the tilting and rotating mechanism according to the present invention and show the state in which the display unit rises from the horizontal state after it was tilted.
Figure 7B:
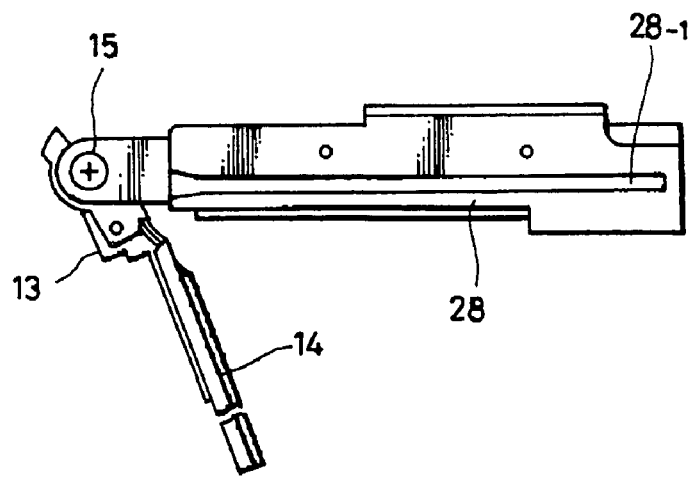

Also, as shown in FIG. 4 and FIGS. 6A and 7A, a torsion coil spring 38 made of a steel wire serving as a first elastic member is provided on the shaft of the thus elongated rotary shaft 15 and it is assembled into the slide unit 1 in such a manner that its respective ends may be engaged with the rotary plate 14 and the mechanical plate 26. At that time, the torsion coil spring 38 is spring-biased in the direction such that the display panel 11 may rise from the horizontal state as shown in FIG. 3B.

More specifically, as shown in FIG. 4 which is the rear perspective view of FIG. 3A, the torsion coil spring 38 is assembled into the slide unit 1 such that the rotary plate 14 and the mechanical plate 26 may be rotated in the direction shown by an arrow (A) or (B) in FIG. 4 under spring force of the torsion coil spring 38.

Further, as shown in FIGS. 6A and 7A, an extension spring 39 made of a steel wire serving as a second elastic member is extended between the erected pin 27 formed on the mechanical plate 26 and the engagement pin 17 erected on the partial gear assembly 13 secured to the rotary plate 14.

The manner in which the spring-biasing force of the extension spring 39 is changed with the rotation of the rotary plate 14 will be described with reference to FIGS. 5A to 5C. In FIGS. 5A to 5C, the direction in which the display panel 11 rises from the horizontal state is set to the counter-clockwise direction relative to the rotation center 13a of the partial gear assembly 13.

One end of the extension spring 39 is engaged with the engagement pin 17 formed on the partial gear assembly 13 and the other end thereof is engaged with the erected pin 27. Then, when the display panel 11 is tilted and rotated so that it may rise from the horizontal state, the rotary plate 14 with the partial gear assembly 13 secured thereto is rotated from the substantially horizontal state shown in FIG. 5A to the rotation end point shown in FIG. 5C via the intermediate position shown in FIG. 5B.

In this embodiment, the engagement pin 17 is formed on the partial gear assembly 13 in such a manner that a distance between the center of the engagement pin 17 and the center of the erected pin 27 may be minimized (length L2) in the state shown in FIG. 5B. More specifically, the engagement pin 17 is formed on the partial gear assembly 13 in such a manner that the center of the extension spring 39 may pass the rotation center 13a of the partial gear assembly 13 while the rotary plate 14 is being rotated as shown in FIG. 5B and that the distance between the center of the engagement pin 17 and the center of the erected pin 27 becomes longer than the length L2 in the horizontal state in which the display unit 10 is slid and moved in the horizontal direction as shown in FIG. 5A (length L1) and in the state in which the display unit 10 is tilted and rotated so as rise from the horizontal state as shown in FIG. 5C (length L3).

As a consequence, a spring-biasing force of the clockwise direction is generated in the state in which the display unit 10 is placed in substantially the horizontal state as shown in FIG. 5A and a spring-biasing force of the counter-clockwise direction is generated in the state in which the display unit 10 is tilted and rotated so as to rise from the horizontal state as shown in FIG. 5C.

According to the above-mentioned arrangement, until the display unit 10 rises from the horizontal, state as shown in FIG. 3B since it has been placed in substantially the horizontal state shown in FIG. 3A, resultant force of moment generated by the weight of the display unit 10 and moment generated by lengths of arms up to action points of the extension spring 39 and the torsion coil spring 38 and the spring-biasing force becomes substantially constant regardless of the rotation position of the rotary plate 14 and hence the display unit 10 is given the spring-biasing force shown by the arrow (A) in FIG. 4.

According to the thus constructed tilting and rotating mechanism 30 of this embodiment, as shown in FIG. 3A, while the display unit 10 is being moved from the equipment main body housing position to the front ejected position, the display unit 10 is given constant spring-biasing force by the motor 32 such that the rotary plate 14 of the display unit 10 may be placed in substantially the horizontal state against the resultant force of moments.

Then, after the display unit 10 has been moved forwards up to the ejected position, the rotary plate 14 is tilted and rotated by the motor 32 until the display unit 10 rises from the horizontal state as shown in FIG. 3B.

Examples of the relationship between rotation angle and generated moment obtained when the torsion coil spring 38 and the extension spring 39 for use with the tilting and rotating apparatus according to this embodiment will be described with reference to FIGS. 8 and 9.

Figure 8:
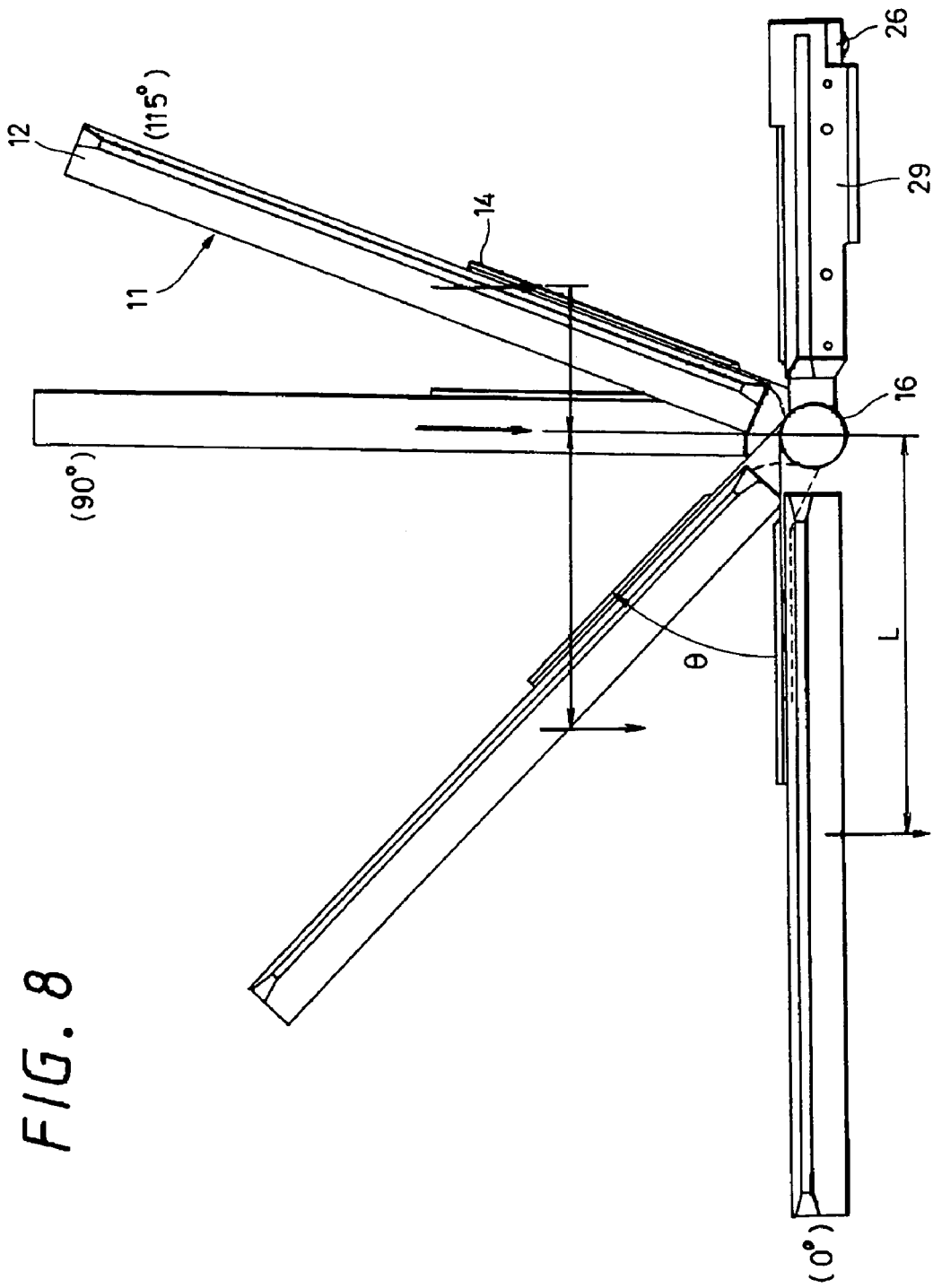
FIG. 8 is a schematic diagram showing the manner in which a display unit is tilted and rotated from substantially the horizontal state relative to a rotary shaft so as to rise from the horizontal state and to which reference will be made in explaining examples of results obtained by a combined spring.

FIG. 8 is a schematic diagram showing the manner in which the display unit 10 is tilted and rotated so as to rise from substantially the horizontal state relative to the rotary shaft 14 wherein θ represents an angle formed between the rotary plate 14 and the mechanical plate 26 comprising the display unit 10.

Also, a downward arrow 8R in FIG. 8 shows the gravity direction of center of gravity at substantially the center of the display unit 10 and reference letter L represents an arm's length of moment generated by gravity. The arm's length L changes as the display unit 10 rotates so that the arm's length L becomes longest when the display unit 10 is placed in substantially the horizontal state ($\theta=0°$) and that the arm's length L becomes shortest (0) when the display unit 10 is placed in the vertical direction ($\theta=90°$).

Figure 9:
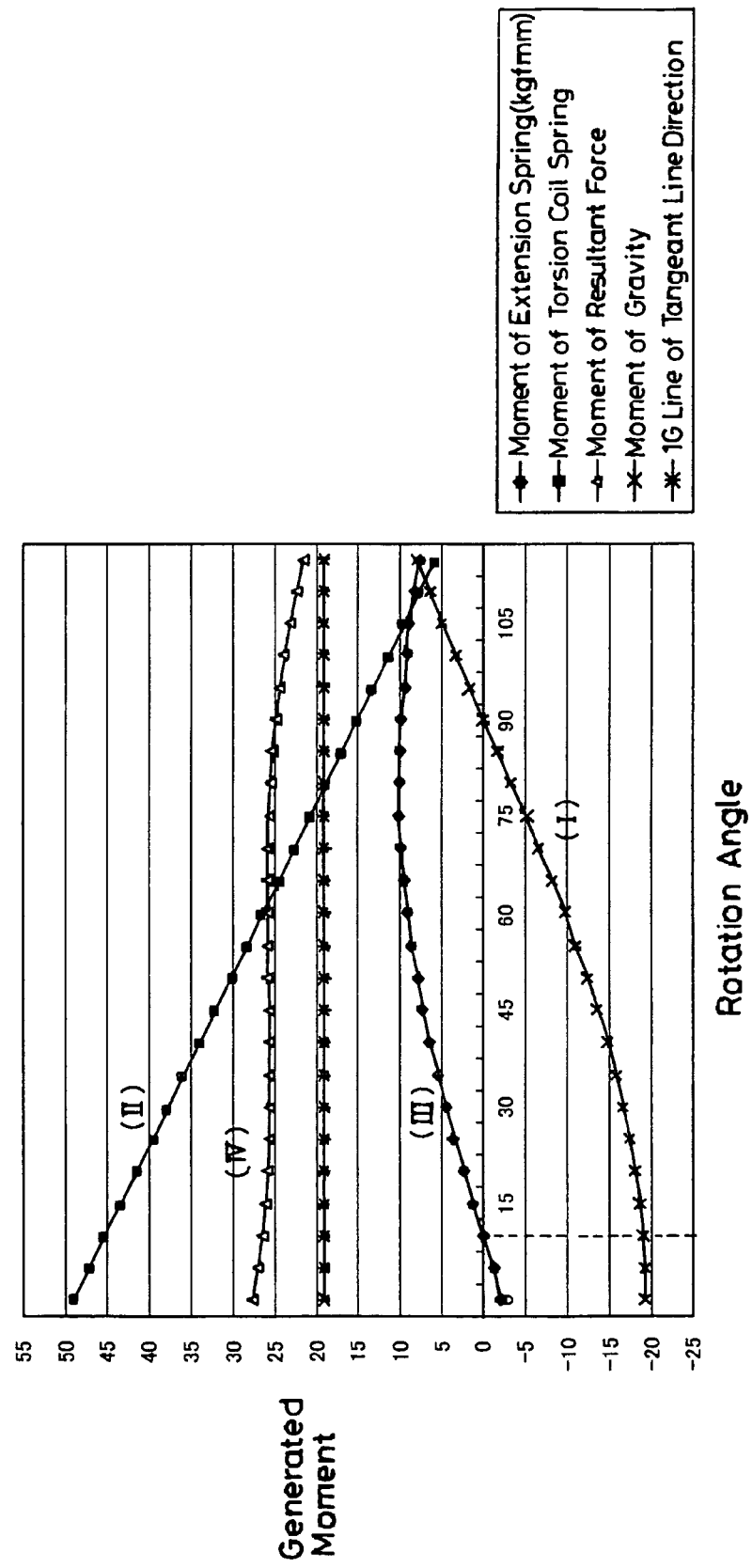
FIG. 9 is a diagram showing characteristic curves obtained when a rotation angle and generated moment of a combined spring are measured.

FIG. 9 shows moments generated in the display unit 10 and moments generated around the rotary shafts 15, 16 of the spring when the display unit 10 is rotated so as to rise ($\theta=115°$) from substantially the horizontal state ($\theta=0°$).

More specifically, FIG. 9 is a diagram showing characteristic curves obtained when the results of moments generated at an interval of 5° relative to the rotation angle θ between the rotary plate 14 and the mechanical plate 26 were plotted in which the horizontal axis represents the rotation angle θ and the vertical axis represents the generated moments (relative values). In FIG. 9, the rotation angle θ is obtained in the state in which the clockwise direction is assumed to be the positive direction and in which the counter-clockwise direction is assumed to be the negative direction.

First, gravity moment shown by a characteristic curve (I) in FIG. 9 and which expresses moment necessary for rotating the display unit 10 will be described.

When the display unit 10 is rotated, as described above, the center of gravity, which exists at substantially the center, also is rotated. Thus, as shown in FIG. 8, in accordance with this rotation of the display unit 10, the arm's length L of the moment generated by the weight of the display unit 10 is changed. Then, the moment necessary for rotating the display unit 10 against the weight of the display unit 10 is calculated by multiplying the weight of the display unit 10 with the length of the arm of the moment. More specifically, when the display unit 10 is placed at the horizontal position ($\theta=0°$), the moment reaches the minimum value −19 in which the absolute value is maximum and is placed in the negative direction. When the display unit 10 is placed at the vertical position (θ=90°), the moment reaches 0. Further, when the display unit 10 finishes rotating and it is placed at the rising position (θ=115°), the moment reaches the maximum value 8.

Spring characteristics of the torsion coil spring 38, shown by a characteristic curve (II) in FIG. 9, will be described next.

The moment generated by the torsion coil spring 38 is obtained by multiplying spring force proportional to the rotation angle with a distance (length of arm of moment) from the center of the torsion coil spring 38 to the engagement position of each plate of both ends of the spring.

The torsion coil spring 38, which is spring-biased around the center axis of the coil, has elastic modulus substantially proportional to the rotation angle of the torsion and spring-biases the display unit 10 in the positive direction in which the display unit 10 can rise from the horizontal direction.

Then, according to this embodiment, when the display unit 10 is placed at the horizontal position (θ=0°), the moment of the torsion coil spring 38 reaches the maximum value 49. When the display unit 10 is placed at the vertical position (θ=90°), the moment of the torsion coil spring 38 reaches the value 15. Further, when the display unit 10 is placed at the rising position (θ=115°), the moment of the torsion coil spring 38 reaches the minimum value 6.

Next, spring characteristics of the extension spring 39, shown by a characteristic curve (III) in FIG. 9, will be described. The moment generated by the extension spring 39 is calculated by multiplying spring force proportional to the extension of the extension spring 39 with eccentricity e obtained between the rotation center 13a of the partial gear assembly 13 and the extension action line as shown in FIGS. 5A and 5C.

The extension spring 39 used herein is an ordinary extension spring having an elastic modulus proportional to the extension of the spring.

In this embodiment, as the display unit 10 is rotated, the engagement pin 17 is rotated at the rotation center 13a of the partial gear assembly 13. As this engagement pin 17 is rotated, one end of the extension spring 39 engaged with the engagement pin 17 is rotated as shown in FIGS. 5A to 5C.

Then, as shown in FIG. 5B, when the rotation center 13a of the partial gear assembly 13 is placed at the center axis of the extension spring 39, the rotation angle is given the maximum spring-biasing force. Either when the rotation angle is smaller (see FIG. 5A) or when the rotation angle is larger (see FIG. 5C), the spring-biasing force of the extension spring 39 decreases. In the state shown in FIG. 5A or in the state shown in FIG. 5C, the extension spring 39 is spring-biased in the opposite direction relative to the rotation center 13a of the partial gear assembly 13.

Then, according to this embodiment, when the display unit 10 is placed at the horizontal position (θ=0°), the moment of the extension spring 39 reaches the minimum value −2. When the display unit 10 is placed at the position (θ=10°), the moment of the extension spring 39 reaches 0. When the display unit 10 is placed at the vertical position (θ=90°), the moment of the extension spring 39 reaches the maximum value 10. Further, when the display unit 10 is placed at the rising position (θ=115°), the moment of the extension spring 39 reaches a value 8.

A characteristic curve (IV) in FIG. 9 shows a moment of resultant force obtained by adding the gravity moment, the moment of the extension spring 39 and the moment of the torsion coil spring 38. More specifically, the moment of resultant force=gravity moment+moment of extension spring 39+moment of torsion coil spring 38.

Since the combined spring is constructed according to this embodiment, the value of the moment of the resultant force lies in a range of from 22 to 27 and hence a substantially constant spring-biasing force can be obtained.

As described above, the spring engagement is provided at the proper position and amount of force is adjusted by properly adjusting spring characteristics of respective springs, whereby substantially constant moment can be obtained.

Motor driving force is transmitted to the gear 34 of the final stage of the reduction gear train 33 against the moment of the resultant force which is the substantially constant spring-biasing force to rotate the partial gear assembly 13 meshed with the gear 34, whereby the display unit 10 is tilted and rotated.

Also, since the reduction gear ratio from the worm 24 fixed to the rotary drive shaft of the motor 32 to the gear 34 of the final stage of the reduction gear train 33 is as large as substantially 1/100, when the tilting and rotating operation of the display unit 10 is stopped at a predetermined angle and the stopped state of the display unit 10 is maintained, holding power of the motor 32 against the spring-biasing force of the above-mentioned combined spring is small and a power consumption of the motor 32 also can be decreased.

Then, a spring-biasing force of one direction around the rotary shafts 15, 16, required when the display unit 10 is placed in substantially the horizontal position or when the display unit 10 rises, and which is required to remove "backlash" of the display unit 10 against vibrations of the vehicle and backlash of the driving gear and the substantially constant moment regardless of the rotation angle can be applied to the tilting and rotating apparatus by the motor 32. Therefore, fluctuation of the driving torque of the motor 32 is small so that the motor 32 having the necessary and minimum driving torque can be selectively used. Thus, the tilting and rotating apparatus can decrease its power consumption and it can also save its space.

According to the electronic equipment tilting and rotating apparatus of this embodiment, the rotary plate 14 and the mechanical plate 26 can drive the motor 32 by a substantially constant tilting and rotating torque in the process in which the rotary plate 14 with the display unit 10 fixed thereto is rotated from substantially the horizontal state to the rising state. Also, since it is sufficient that a driving torque required by the motor 32 should be a necessary and minimum driving torque, the motor 32 can be miniaturized and decreased in power consumption.

Further, it is possible to constantly hold the electronic equipment tilting and rotating apparatus in the state in which it is free from "backlash" against the vibrations of the vehicle and backlash of the driving gear.

According to the electronic equipment tilting and rotating apparatus of this embodiment, while the torsion coil spring 38 made of the steel wire is used as the first elastic member and the extension spring 39 made of the steel wire is used as the second elastic member as described above, the present invention is not limited thereto and elastic members made of various materials can be used. That is, elastic members made of other materials than the steel wire can be used and a resin itself having high elasticity need not be formed like a coil-like elastic member but such resin may be formed as a block-like elastic member by a molding process.

Having described preferred embodiments of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A display apparatus comprising:
   an electronic equipment main body;
   a rotating mechanism;
   a sliding/moving mechanism;
   a unit housed within the electronic equipment main body, said unit being movable in a horizontal direction relative to the electronic equipment main body by use of the sliding/moving mechanism, said unit having a first member and a rotatable member, said rotatable member having a display unit coupled thereto and being rotatably joined to the first member by way of a rotary shaft, said rotatable member being tiltable and rotatable around the rotary shaft and against gravity by the rotating mechanism from a horizontal position to a position for use;
   a first elastic member for spring-biasing said rotatable member around the rotary shaft to cause said rotatable member to rise from the horizontal position; and
   a second elastic member for spring-biasing said rotatable member in a direction of rotation while said rotatable member is being rotated from the horizontal position in which said second elastic member makes a driving torque become substantially constant against a weight of said rotatable member.

2. The apparatus according to claim 1, wherein said second elastic member has one end engaged with a pin coupled to said unit and has an other end engaged with an engagement pin disposed at a position displaced from a center of the rotary shaft of said rotatable member, said second elastic member being disposed such that a length thereof becomes longest while said rotatable member is being tilted and rotated.

3. The apparatus according to claim 1, wherein said first elastic member comprises a torsion coil spring and said second elastic member comprises an extension spring.

4. The apparatus according to claim 2, wherein said first elastic member comprises a torsion coil spring and said second elastic member comprises an extension spring.

5. The apparatus according to claim 1, wherein said first elastic member and said second elastic member are arranged on the rotating member.

6. The apparatus according to claim 1, wherein the second elastic member spring-biases said rotatable member in a direction opposite to the direction of rotation when said rotatable member is the horizontal position.

* * * * *